United States Patent

[11] 3,609,169

[72] Inventors Kazumi Iijima
 Kawasaki-shi;
 Yoshioki Komachiya, Yokohama-shi; Eiji Negoro, Kawasaki-shi, all of Japan
[21] Appl. No. 727,686
[22] Filed May 8, 1968
[45] Patented Sept. 28, 1971
[73] Assignee Ajinomoto Co., Inc.
 Tokyo, Japan
[32] Priority May 12, 1967
[33] Japan
[31] 42/30131

[54] METHOD OF PREPARING 3,9-BIS-(AMINOALKYL)-2,4,8,10-TETROXASPIRO [5,5]UNDECAN
3 Claims, No Drawings
[52] U.S. Cl. ..................................................... 260/340.7
[51] Int. Cl. ..................................................... C07d 15/04
[50] Field of Search ........................................... 260/340.7, 340.9

[56] References Cited
OTHER REFERENCES
" Chemical Abstracts," Vol. 43, 1949, col. 6652(g) (Abstract of Swiss Patent No. 244,837) (June 16, 1947).

Primary Examiner—Alex Mazel
Assistant Examiner—James H. Turnipseed
Attorney—Kurt Kelman ABSTRACT: The yield of 3,9-bis(aminoalkyl)-2,4,8,10-tetroxaspiro [5,5] undecanes from the catalytic hydrogenation of the corresponding 3,9-bis(cyanoalkyl)-2,4,8,10-tetroxaspiro [5,5]undecanes is increased over known methods, and the recovery of the product from the hydrogenation mixture is facilitated if the dinitrile is hydrogenated in the molten condition in the presence of ammonia and a Raney cobalt or nickel formate catalyst in the absence of a solvent or diluent.

METHOD OF PREPARING 3,9-BIS-(AMINOALKYL)-2,4,8,10-TETROXASPIRO [5,5]UNDECAN

This invention relates to an improvement in the preparation of 3,9-bis(aminoalkyl)-2,4,8,10-tetroxaspiro[5,5]undecane which is a diamine of the formula

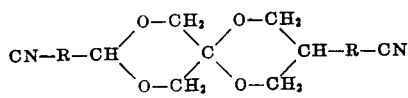

by catalytic hydrogenation of the corresponding dinitrile of the formula

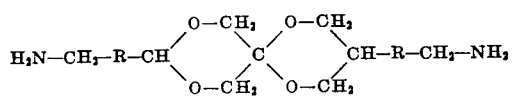

which is 3,9-bis(cyanoalkyl)-2-4-8-10-tetroxaspiro[5,5]undecane, R in the formula being alkyl having 2 to 10 carbon atoms, the compounds represented by the above formulas being referred to hereinafter as "the diamine" and "the dinitrile."

The diamine is a known curing agent for epoxy resins and may be used for preparing polyamides and polyurethanes.

It is known from U.S. Pat. No. 2,996,517 to hydrogenate the dinitrile in an inert solvent with a Raney nickel catalyst at temperatures of 100° to 125° C. and hydrogen pressures of 50-150 p.s.i. The yields are 60 to 80 percent. Recovery of a pure product from the hydrogenation mixture is relatively difficult because of the need for removing the solvent and the byproducts formed in substantial amounts.

It is the object of this invention to improve the known hydrogenation method so as to increase the yield and to facilitate the recovery of a pure diamine.

We have found that the dinitrile as well as the diamine are stable in a hydrogen atmosphere at and above the respective melting points, and that the diamine can be obtained at practically 100 percent yield from the dinitrile by introducing hydrogen under pressure into the dinitrile which is in the molten state, in the absence of any solvent or diluent. We have further found that ammonia in the hydrogenation mixture increases the yield and suppresses the formation of undesirable byproducts, and that Raney cobalt and nickel formate catalysts in contact with the dinitrile are superior to Raney nickel catalysts for the purpose of the instant invention.

We have successfully hydrogenated many dinitriles of the above formula which are readily prepared by the method of the afore-mentioned patent from formyl nitrile or its alkyl acetal and pentaerythritol in the presence of an acid catalyst. They are crystalline materials whose melting points are under 110° C., and whose melts are very viscous. The viscosity of the melts has been found not to interfere with rapid hydrogenation.

The amount of ammonia present in the hydrogenation mixture need not be controlled closely. Good results are generally obtained when the mixture contains 0.5 to 4 mole percent based on the dinitrile originally present, but these limits are not critical. The formation of undesired byproducts is entirely suppressed when the partial pressure of the ammonia in a closed hydrogenation vessel is between 1 and 8.5 kg./cm.$^2$ when reduced to room temperature (15°-20° C.). The preferred partial pressure of ammonia is 2 to 8.5 kg./cm.$^2$. The preferred partial pressure corresponds to the equilibrium vapor pressure of liquid ammonia between −15° C. and +35° C., and is readily maintained by connecting the reaction vessel with a sealed container holding liquid ammonia and maintained at the desired temperature, which may be the ambient temperature under most conditions.

The preferred Raney cobalt catalysts for the method of the invention may be prepared by developing binary or tertiary cobalt-aluminum alloys in a conventional manner, either cobalt-aluminum or cobalt-manganese-aluminum alloys being suitable. For best results, convenient recovery of the diamine and of the catalyst, the amount of Raney cobalt present in the hydrogenation mixture should be between 0.5 and 10 percent of the dinitrile. A weight range of 3 to 10 percent is preferred for a nickel formate catalyst.

The hydrogen pressure is preferably held at 20 to 150 kg./cm.$^2$, but may be as low as 10 or as high as 300 kg./cm.$^2$. The hydrogenation temperature must be higher than the melting point of the dinitrile used at the prevailing pressure, and is preferably between 110° and 150° C., but other temperatures between 70° C. and 200° C. have been used with at least a fair measure of success. The hydrogenation is usually completed within 30 to 90 minutes.

The hydrogenation mixture essentially consists of the molten diamine and the catalyst when pressure is released from the reaction vessel, whereby the ammonia present is dissipated. The dispersed catalyst can be separated from the molten diamine by filtration or centrifuging, and the viscous liquid may then be permitted to solidify. It does not require purification for many applications but may be distilled in a vacuum if unusually high purity requirements have to be met. The yield of the distilled diamine is higher than 90 percent based on the original dinitrile. There are no byproducts in significant amounts.

The hydrogenation vessel may be filled with the dinitrile as a continuous phase to about 80 percent of its capacity so that a desired batch size can be confined in pressure vessels much smaller than those employed heretofore when the vessel also had to accommodate substantial amounts of solvent.

The following examples are further illustrative of this invention.

EXAMPLE 1

A 300ml. stainless steel autoclave equipped with an electromagnetic stirrer was charged with 150 g. 3,9-bis(2-cyanoethyl)-2,4,8,10-tetroxaspiro[5,5]undecane (M.P. 72° C.) and 3 g. Raney cobalt catalyst. It was then closed and connected with a pressure bottle containing liquid ammonia at 20° C., whereby the pressure rose by 8.5 kg./cm.$^2$. Hydrogen was admitted to the autoclave until the internal pressure reached 100 atm., and the autoclave was held in an oil bath at 140° C. for 30 minutes while the stirrer was operated. The hydrogen absorption had come to an end by that time.

The autoclave was cooled to about 60° C. and it was then opened, and its contents were quickly filtered. The filtrate was distilled in a vacuum, and 147.5 g. pure 3,9-bis(3-aminopropyl)-2,4,8,10-tetroxaspiro[5,5]undecane (95.5 percent yield) were recovered as a fraction boiling at 204° C. at 3 mm. Hg. The compound melted at 52.4°-52.8° C. (uncorr.)

It was identified by the absorption bands in its infrared spectrum at 3,400 cm.$^{11}$, 3,320 cm.$^{11}$, and 1,600 cm.$^{11}$ due to the amino group, and at 1,200-1,100 cm.$^{11}$ due to the spiroacetal group. It was further identified as $C_{13}H_{26}O_4N_2$ by elementary analysis:

Calculated: 56.91% C; 9.55% H; 10.21% N
Found: 56.66   9.88   10.17

The yield was 96.1 percent when the initial ammonia pressure was reduced to 4 kg./cm.$^2$.

In an analogous manner, 100.0 g. 3,9-bis(2-cyanoethyl)-2,4,8,10-tetroxaspiro[5,5]undecane were converted to 99.5 g. 3,9-bis(3-aminopropy)-2,4,8,10-tetroxaspiro[5,5]undecane (96.6 percent yield) by means of a catalyst developed from 2 g. cobalt-manganese-aluminum alloy.

When 100 g. of the same dinitrile were hydrogenated at an ammonia pressure of 8 kg./cm.$^2$ and a hydrogen pressure of 100 kg./cm.$^2$ at 150° C. for 90 minutes in the presence of 5 g. nickel formate, 94.1 g. of the diamine were obtained for a yield of 91.3 percent.

EXAMPLE 2

100 g. 3,9-Bis(1,1-dimethyl-3-cyanopropyl)-2,4,8,10-tetroxaspiro[5,5]undecane (M.P 101°-102° C.) were hydrogenated in the autoclave described in example 1 with 5 g. Raney cobalt at an ammonia gas pressure of 6 kg./cm. (10° C.) and a hydrogen pressure of 70 kg./cm.$^2$ at 130° C. for 25 minutes.

The hydrogenation mixture was worked up as described in example 1, and 97.2 g. 3,9-bis(1,1-dimethyl-3-cyanopropyl)-2,4,8,10-tetroxaspiro[5,5]undecane (97.2 percent yield) were recovered as a fraction boiling at 195°–197° C. at 1–2 mm. Hg, and melting at 120°–122° C. The material showed IR absorption bands at 3,400 cm.$^{11}$, 3,320 cm.$^{11}$, and 1,600 cm.$^{11}$ (NH$_2$), and was identified by its elementary analysis:

Calculated: 63.69% C; 10.61% N; 7.82% H
Found: 63.78    10.76    7.77

EXAMPLE 3

Higher homologs of the dinitriles referred to in examples 1 and 2 were hydrogenated in the same equipment in respective runs following closely similar procedures. Table 1 lists the specific meaning of R in the above formulas for each run, the melting point of the dinitrile, the initial partial pressures of ammonia and hydrogen in the hydrogenation vessel at room temperature, the hydrogenation temperature and time, the yield of diamine in mole percent of the dinitrile used, and the boiling and melting points of the dinitrile whose composition was confirmed by elementary analysis in each instance.

The initial charge included 100 g. dinitrile and 5 g. Raney cobalt in each run.

TABLE 1

| R | n-C$_4$H$_8$ | n-C$_5$H$_{10}$ | n-C$_6$H$_{12}$ | n-C$_{10}$H$_{20}$ |
|---|---|---|---|---|
| M.P. ° C., dinitrile | 78.5–79.0 | | 48 | 85 |
| Hydrogenation: | | | | |
| NH$_3$, kg./cm.$^2$ | 7.5 | 8.3 | 5.2 | 10.0 |
| H$_2$, kg./cm.$^2$ | 95 | 107 | 120 | 100 |
| Temp., ° C | 140 | 120 | 110 | 150 |
| Time, min | 60 | 80 | 90 | 80 |
| Diamine: | | | | |
| Yield, percent | 97.0 | 92.5 | 98.0 | 93.2 |
| B.P., ° C./mm. Hg | 205–207/2 | 217–221/0.2 | 220–240/0.15 | |
| M.P., ° C | 55–57 | 45 | 74–75 | 94 |

In an otherwise identical second series of runs, the Raney cobalt was replaced by 5 g. nickel formate, and respective slightly lower yields of 92 percent, 90.5 percent, 94.0 percent, and 91.0 percent were obtained.

EXAMPLE 4

The effect of solvent admixtures on the hydrogenation of 3,9-bis(2-cyanoethyl)-2,4,8,10-tetroxaspiro[5.5]undecane was determined in the aforedescribed equipment under the conditions of example 1 as far as not stated otherwise. 50 g. dinitrile were hydrogenated in the presence of 1.5 g. Raney cobalt, 50 ml. solvent, if any, with hydrogen at 100 atm. at 140° C. with stirring. The hydrogenation mixture was filtered to remove the catalyst and fractionated in a vacuum to recover 3,9-bis(3-aminopropyl)-2,4,8,10-tetroxaspiro[5,5]undecane having a boiling point of 162°–163° C. at 1.5 mm. Hg.

The solvent employed, the time required to complete the absorption of hydrogen, and the yield are listed in table 2 for each run.

Table 2

| Solvent | Diamine yield, % | Time, min. |
|---|---|---|
| Liquid ammonia | 80 | 150 |
| 28% Aqueous Ammonia | 77 | 30 |
| Methanol sat'd. with NH$_3$ | 82 | 30 |
| i-Propanol sat'd. with NH$_3$ | 83 | 35 |
| Water | 65 | 40 |
| None | 96.5 | 20 |

Ammonia was supplied to the last run listed in table 2 in the manner described in example 1.

When the hydrogenation tests, whose results are listed in Table 2, were repeated with other catalysts, the yields obtained, if any, were too low for preparation of the diamines on an industrial scale. The catalysts tested without success or with inferior results included Raney nickel, nickel on diatomaceous earth, palladium, platinum, rhodium, and ruthenium.

What is claimed is:
1. In a method of converting a dinitrile of the formula

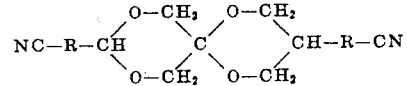

to a diamine of the formula

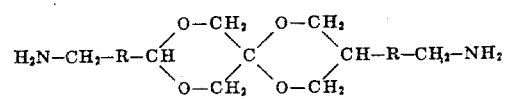

by catalytic hydrogenation, in said formulas R being alkylene having two to ten carbon atoms, the improvement in the hydrogenation which comprises:

a. confining said dinitrile in a closed vessel;
b. introducing hydrogen into said confined dinitrile under a pressure of 10 to 300 kg./cm.$^2$ when reduced to room temperature while said dinitrile is in the molten state at a temperature between 70° and 200° C. and in contact with a nickel formate or Raney cobalt catalyst; and
c. maintaining in said vessel a partial ammonia pressure between 1 and 8.5 kg./cm.$^2$, when reduced to room temperature, and sufficient to maintain in the molten dinitrile an ammonia concentration effective for substantially completely suppressing the formation of byproducts other than said diamine.

2. In a method as set forth in claim 1, said dinitrile constituting a continuous phase in said vessel, said catalyst being dispersed in said molten dinitrile.

3. In a method as set forth in claim 2, said catalyst being dispersed in said continuous phase in an amount of 0.5 to 10 percent by weight.